US005614340A

United States Patent [19]

Bugner et al.

[11] Patent Number: 5,614,340

[45] **Date of Patent: *Mar. 25, 1997**

[54] MIGRATION IMAGING, OPTIONALLY WITH DYES OR PIGMENTS TO EFFECT BLEACHING

[75] Inventors: Douglas E. Bugner; William Mey, both of Rochester; Dennis R. Kamp, Spencerport, all of N.Y.

[73] Assignee: Eastman Kodak Company, Rochester, N.Y.

[ * ] Notice: The portion of the term of this patent subsequent to Jun. 6, 2015, has been disclaimed.

[21] Appl. No.: 127,632

[22] Filed: Sep. 27, 1993

Related U.S. Application Data

[63] Continuation-in-part of Ser. No. 745,661, Aug. 16, 1991, abandoned.

[51] Int. Cl.[6] ............................ G03G 13/00; G03G 9/00; G03G 5/16; G02F 1/00

[52] U.S. Cl. ............................ 430/41; 430/39; 430/106; 430/109; 430/110; 430/130; 430/334; 430/339; 430/340; 430/348; 250/316.1; 250/317.1; 250/318; 252/186.1; 252/583; 252/586; 252/587

[58] Field of Search ............................ 430/39, 41, 106, 430/109, 110, 130, 334, 339, 340, 348; 250/316.1, 317.1, 318; 252/186.1, 586, 587, 583

[56] References Cited

U.S. PATENT DOCUMENTS 3,410,203 11/1968 Fischbeck .
3,780,214 12/1973 Bestenreiner et al. .................. 358/503
3,836,364 9/1974 Lin .................. 430/41
3,850,631 11/1974 Tamai .................. 430/134
4,007,042 2/1977 Buckley et al. .................. 430/41

(List continued on next page.)

FOREIGN PATENT DOCUMENTS

PCT/US87/03249 12/1987 WIPO .

OTHER PUBLICATIONS

Gundlach, Robert W., "Xeroprinting Master with Impoved Contrast Potential, Xerox Disclosure Journal", vol. a4, No. 4, Jul./Aug. 1989, pp. 205–206.

Roshon et al., "Printing by Means of a Laser Beam", IBM Techical Disclosure Bulletin, vol. 7, No. 3, Aug. 1964.

Article from "Democrat and Chronicle" (Rochester, New York), Oct. 31, 1993, New Xerox film rivals 'the Kodaks' (2 pages).

Article from "The New York Times", Nov. 2, 1993, Xerox Announces a New Silver–Free Film, Causing a Stir (1 Page).

Article from "The Wall Street Journal", Nov. 2, 1993, Xerox Unveils Silverless Graphics Film, Posing a Threat to Kodak Stronghold (1 Page).

*Primary Examiner*—George F. Lesmes
*Assistant Examiner*—Bernard Codd
*Attorney, Agent, or Firm*—John R. Everett

[57] ABSTRACT

A bleachable composition, including an acid photogenerator and a near-infrared radiation-absorbing dye or pigment, is utilized in a method of migration imaging to prevent unwanted absorptions. This composition can be incorporated either in the thermoplastic imaging surface layer of the imaging element, in the marking particles applied to the element, or both. Alternatively, the components of the bleachable composition can be separated with one in the thermoplastic imaging surface layer and the other in the marking particles. After the imaging element is marked and exposed with near-infrared radiation, the bleachable composition caused exposed portions of the imaging element to be bleached. If further bleaching is needed, the element can subsequently be exposed with near-ultraviolet radiation. A migration imaging method, which does not employ the bleachable composition of the present invention, wherein marking particles are magnetically attracted to the imaging element, is also provided.

20 Claims, 5 Drawing Sheets

U.S. PATENT DOCUMENTS

| | | | |
|---|---|---|---|
| 4,072,517 | 2/1978 | Goffe et al. | 430/41 |
| 4,123,578 | 10/1978 | Perrington et al. | 428/206 |
| 4,125,322 | 11/1978 | Kaukeinan et al. | 355/326 R |
| 4,139,853 | 2/1979 | Ghekiere et al. | 430/290 |
| 4,148,057 | 4/1979 | Jesse | 347/232 |
| 4,494,865 | 1/1985 | Andrus et al. | 355/32 |
| 4,536,457 | 8/1985 | Tam | 430/41 |
| 4,536,458 | 8/1985 | Ng | 430/41 |
| 4,542,084 | 9/1985 | Watanabe et al. | 430/46 |
| 4,626,868 | 12/1986 | Tsai | 347/129 |
| 4,701,402 | 10/1987 | Patel et al. | 430/332 |
| 4,711,834 | 12/1987 | Butters et al. | 430/201 |
| 4,883,731 | 11/1989 | Tam et al. | 430/41 |
| 4,937,157 | 6/1990 | Haack et al. | 430/110 |
| 4,942,110 | 7/1990 | Genovese et al. | 430/198 |
| 4,945,020 | 7/1990 | Kempf et al. | 430/49 |
| 5,166,041 | 11/1992 | Murofushi et al. | 430/339 |

FIG. 2
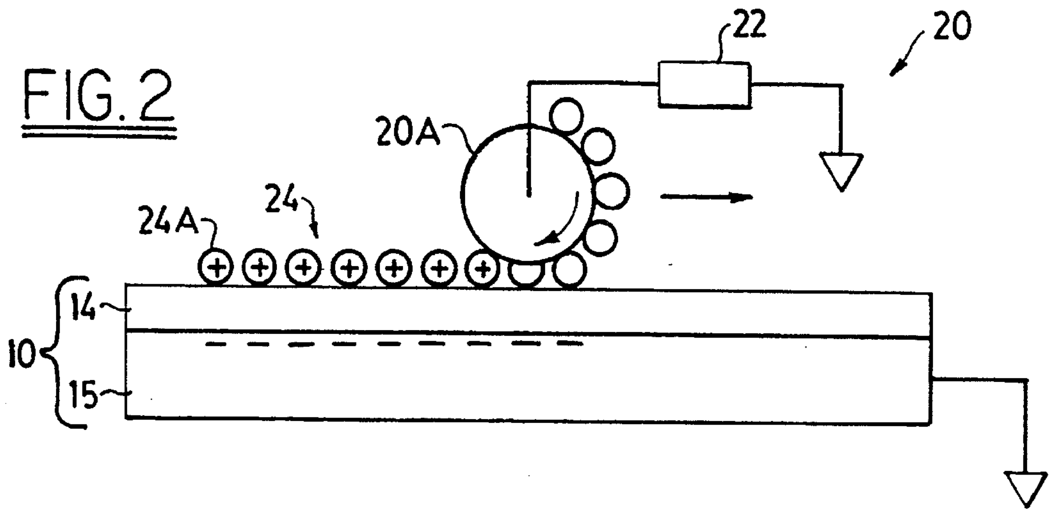
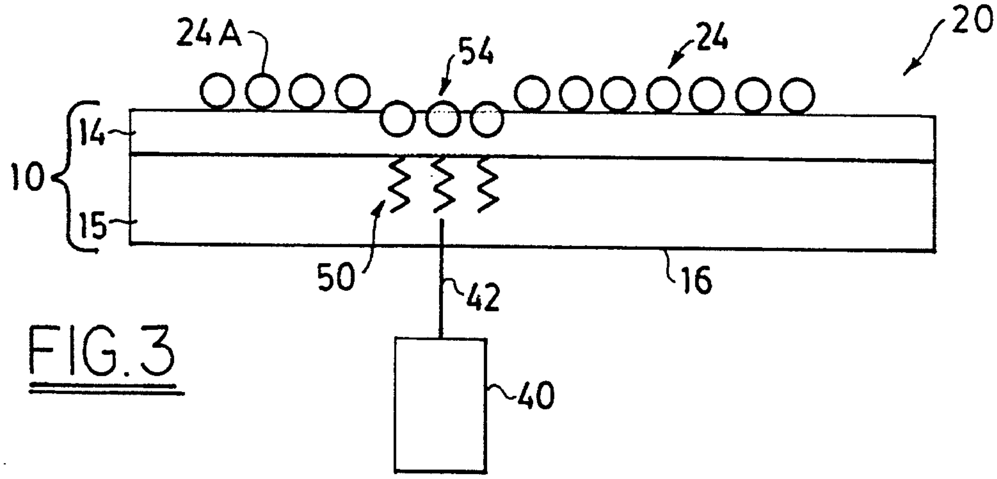
FIG. 3
FIG. 4
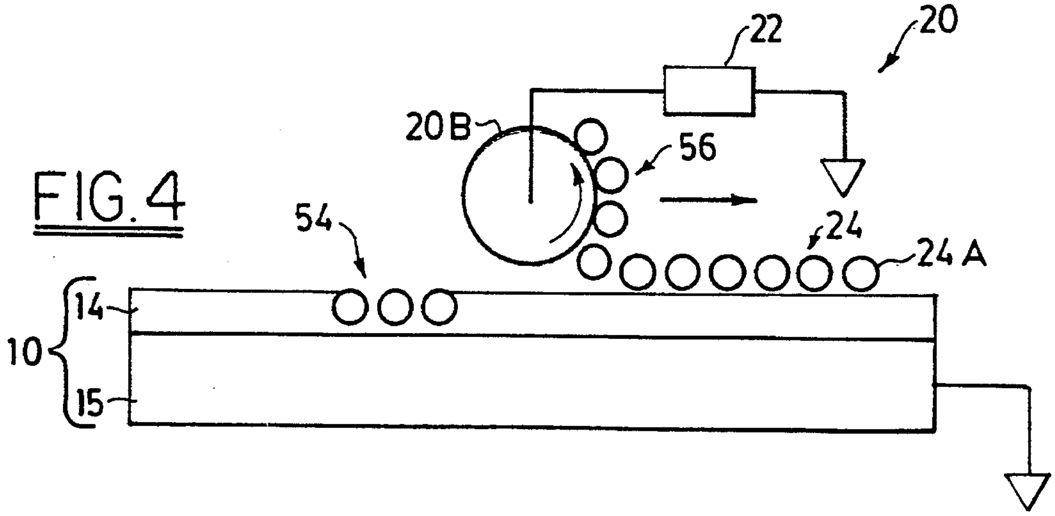

MIGRATION IMAGING, OPTIONALLY WITH DYES OR PIGMENTS TO EFFECT BLEACHING

CROSS-REFERENCE TO RELATED APPLICATION

This application is a continuation-in-part of application Ser. No. 07/745,661, filed Aug. 16, 1991 now abandoned.

FIELD OF THE INVENTION

This invention relates to a migration imaging process utilizing near-infrared radiation.

BACKGROUND OF THE INVENTION

There are a wide variety of electrophotographic imaging techniques. One such process, known as migration imaging, involves the arrangement of particles on a softenable medium. Typically, the medium, which is solid and impermeable at room temperature, is softened with heat or solvents to permit particle migration in an imagewise pattern.

As disclosed in R. W. Gundlach, "Xeroxprinting Master with Improved Contrast Potential," *Xerox Disclosure Journal,* Vol. 14, No. 4, July/August 1984, pages 205–06, migration imaging can be used to form a xeroxprinting master element. In this process, a monolayer of photosensitive particles are placed on the surface of a layer of polymeric material which is in contact with a conductive layer. After charging, the element is subjected to imagewise exposure which softens the polymeric material and causes migration of particles where such softening occurs (i.e. image areas). When the element is subsequently charged and exposed, the image areas (but not the non-image areas) can be charged, developed, and transferred to paper.

Another type of migration imaging technique, disclosed in U.S. Pat. Nos. 4,536,457 to Tam, 4,536,458 to Ng, and 4,883,731 to Tam et al., utilizes a solid migration imaging element having a substrate and a layer of softenable material with a layer of photosensitive marking material deposited at or near the surface of softenable layer. A latent image is formed by electrically charging the member and then exposing the element to an imagewise pattern of light to discharge selected portions of the marking material layer. The entire softenable layer is then made permeable by application of the marking material, heat or a solvent, or both. The portions of the marking material which retain a differential residual charge due to light exposure will then migrate into the softened layer by electrostatic force.

An imagewise pattern may also be formed with colorant particles in a solid imaging element by establishing a density differential (e.g., by particle agglomeration or coalescing) between image and non-image areas. Specifically colorant particles are uniformly dispersed and then selectively migrated so that they are dispersed to varying extents without changing the overall quantity of particles on the element.

Another migration imaging technique involves heat development, as described by R. M. Schaffert, *Electrophotography,* (Second Edition, Focal Press, 1980), pp. 44–47 and U.S. Pat. No. 3,254,997. In this procedure, an electrostatic image is transferred to a solid imaging element, having colloidal pigment particles dispersed in a heat-softenable resin film on a transparent conductive substrate. After softening the film with heat, the charged colloidal particles migrate to the oppositely charged image. As a result, image areas have an increased particle density, while the background areas are less dense.

Migration imaging can also utilize a solid, multilayered donor-acceptor imaging element having a uniform fracturable layer of marking particles, a marking particle release layer, a supporting carrier or sheet, and an adhesive-coated acceptor layer over the marking particle layer. By locally heating the element in an imagewise pattern, the heated marking particles are softened. This diminishes their attraction to the donor portion to a level below that of the attraction of particles in unheated areas. The acceptor layer may then be stripped from the element, removing the imaged pattern of marking particles from the release layer. Such systems cannot, however, achieve high resolution image reproduction, because any image area of the particulate layer must be cohesive enough to be carried with the peel-away layer, yet break cleanly at a border with a non-image area. Serifs, fine lines, dot images, and the like often have undesirably ragged edges with such processes. Such imaging techniques are disclosed, for example, in WO 88/04237 to Polaroid Corporation.

Although migration imaging can be achieved by exposure with various types of radiation, the use of near-infrared radiation, having a wavelength of 700 to 1,000 nm, would be particularly desirable. Such radiation can be produced with laser diodes which are relatively inexpensive and consume little energy. Effective use of near-infrared radiation in migration imaging, however, requires the presence of a near-infrared sensitizer which tends to absorb not only near-infrared radiation, but also visible radiation. This is detrimental, because visible absorptions remain in the resulting image. As a result, the final image has a corrupt color balance, when the sensitizer is incorporated in the marking particles of the migration imaging system, or a discolored background, when the sensitizer is included in the migration imaging element. These problems have made imaging with near-infrared radiation undesirable despite its economic benefits.

SUMMARY OF THE INVENTION

The present invention relates to a method of migration imaging with near-infrared radiation on a thermoplastic imaging surface layer using a bleachable composition which includes an acid photogenerator and a near-infrared radiation absorbing dye or pigment which undergoes bleaching during exposure. The bleachable composition can be incorporated in the imaging element, the marking particles, or both. Alternatively, the acid photogenerator is in either the thermoplastic imaging surface layer or the marking particles, while the near-infrared radiation absorbing dye or pigment is present in the other location. The use of the bleachable composition eliminates any unwanted absorption of visible radiation from the resulting imaged element.

In addition to containing an acid photogenerator and a near-infrared radiation absorbing dye or pigment, the bleachable composition, whether incorporated in the imaging element or in the marking particles, may include a near-ultraviolet radiation sensitizer and/or a thermoplastic polymer binder.

The migration imaging method of the present invention requires deposition of marking particles as a substantially continuous layer on a thermoplastic imaging surface layer of an imaging element. After an attraction between the marking particles and the imaging element is established, the imaging element is exposed with an imagewise pattern of near-infrared radiation so that exposed particles migrate into the imaging surface layer. Unexposed marking particles are then removed from the imaging element. It is particularly preferred that the imaging element include a conductive layer in electrical contact with the thermoplastic imaging surface layer so that an electrostatic attraction can be achieved between the imaging element and the marking particles. Alternatively, the marking particles may be magnetically attracted to the imaging element, either alone or in conjunction with electrostatic forces.

BRIEF DESCRIPTION OF THE DRAWINGS

FIG. 2 is a side schematic view, showing the deposition of marking particles on the imaging element of FIG. 1C.

FIG. 3 is a side schematic view, showing the imaging element of FIG. 2 undergoing imagewise exposure.

FIG. 4 is a side schematic view, showing the cleaning of the exposed imaging element of FIG. 3.

DETAILED DESCRIPTION OF THE DRAWINGS

The present invention relates to a migration imaging process, utilizing a bleachable composition containing an acid photogenerator and a near-infrared radiation absorbing dye or pigment. This composition can be utilized in the imaging element itself, in the marking particles, or both. Alternatively, the acid photogenerator is in either the thermoplastic imaging surface layer or the marking particles, while the near-infrared radiation absorbing dye or pigment is present in the other location. The process of the present invention is generally described below with reference to FIGS. 1 to 4.

Figure 1A:
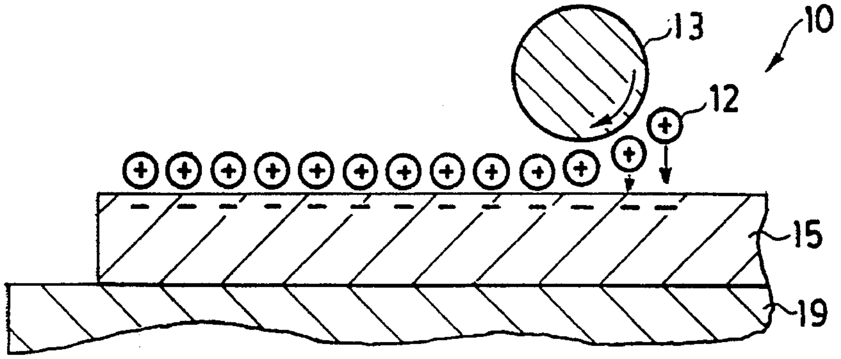
FIG. 1A is a side schematic view, showing the placement of a layer of thermoplastic powder on a support section to produce an imaging element according to the present invention.
Figure 1B:
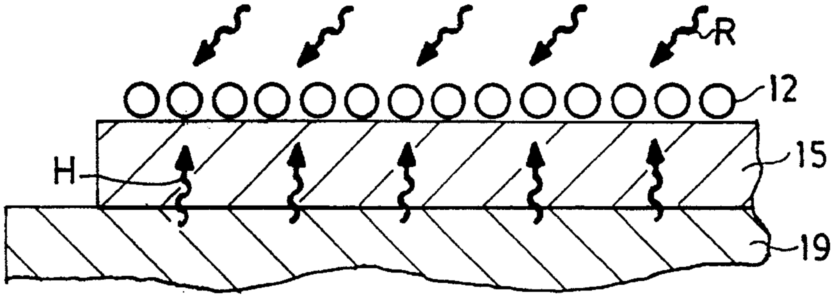
FIG. 1B is a side schematic view, showing the heating of the thermoplastic particle layer of FIG. 1A to form a thermoplastic imaging surface layer.
Figure 1C:
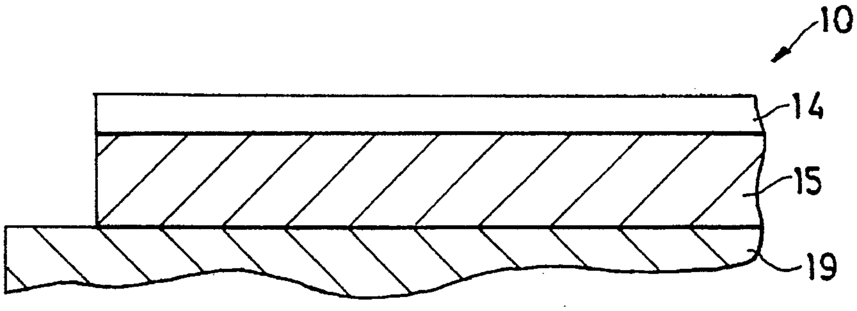
FIG. 1C is a side schematic view of the imaging element of FIG. 1B after the thermoplastic imaging surface layer has cooled.

FIGS. 1A–1C are side schematic views, showing a layer of thermoplastic powder being placed on a supporting section, melted with heat, and cooled, respectively, to produce the imaging element of the present invention. As shown in FIG. 1A, conductive section 15 on support section 19 receives a layer of clear thermoplastic particles 12. Particles 12 may be deposited by use of first particle deposition means 13 such as a magnetic brush charged with a quantity of thermoplastic particles, such as clear dry toner mixed with magnetic carrier particles.

Thermoplastic particles 12 are composed of a thermoplastic material which may be heated to effect a reversible transition from a nominally solid state to a plastic state. In one embodiment of the present invention, this thermoplastic material includes the bleachable composition comprising an acid photogenerator and a near-infrared radiation-absorbing dye or pigment which undergoes bleaching when exposed with such radiation.

Although generally any compound which generates an acid upon near-infrared radiation exposure may be useful, the acid-photogenerating compound of the element of the present invention should be selected to leave the near-infrared absorbing dye or pigment unbleached before the element is exposed to activating radiation. Additionally, the acid-photogenerating compound should not absorb strongly in the visible region of the spectrum unless this absorption is ineffective in bleaching the near-infrared radiation absorbing dye or pigment. Although there are many known acid photogenerators useful with ultraviolet and visible radiation, the utility of their exposure with near-infrared radiation is unpredictable. Potentially useful aromatic onium salt acid photogenerators are disclosed in U.S. Pat. Nos. 4,661,429, 4,081,276, 4,529,490, 4,216,288, 4,058,401, 4,609,055, 3,981,897, and 2,807,648 which are hereby incorporated by reference. Such aromatic onium salts include Group Va, Group VIa, and Group VIIa elements. The ability of triarylselenonium salts and triarylsulfonium salts to produce protons upon exposure to ultraviolet and visible light is also described in detail in "UV Curing, Science and Technology", Technology Marketing Corporation, Publishing Division, 1978.

A representative portion of useful Group Va onium salts are:

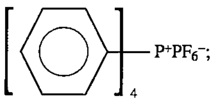

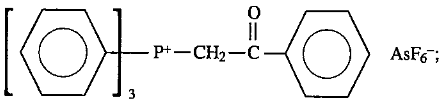

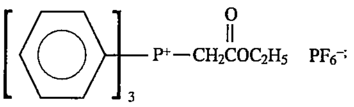

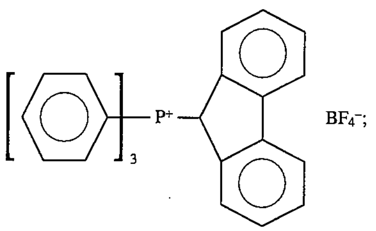

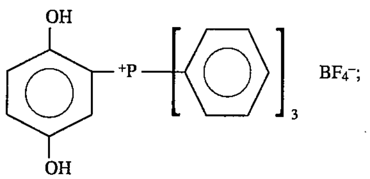

-continued
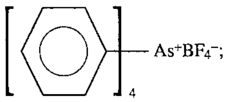
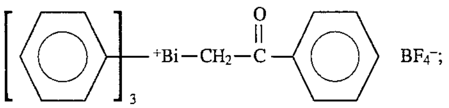
A representative portion of useful Group VIa onium salts, including sulfonium and selenonium salts, are:
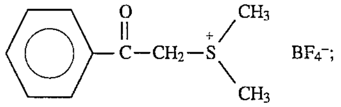
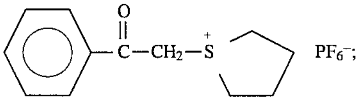
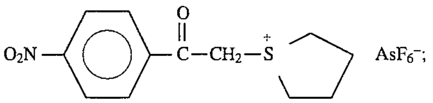
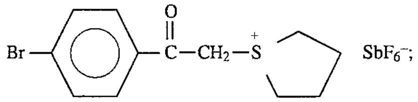
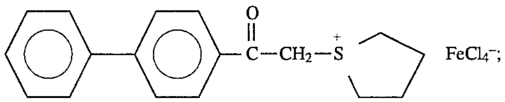
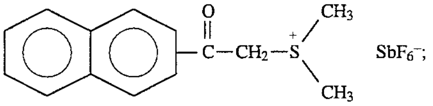
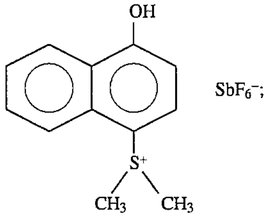
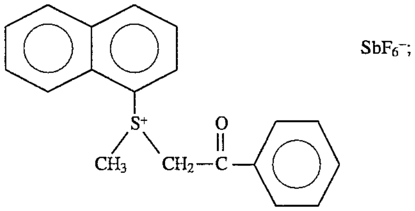
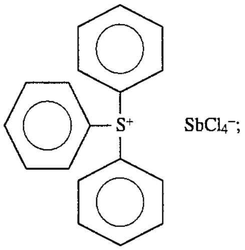
-continued
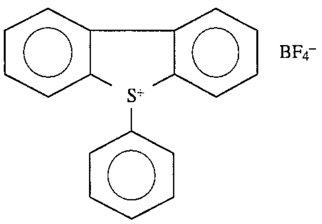
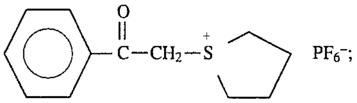
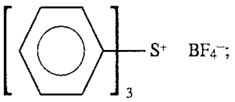
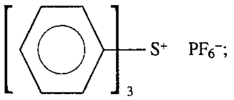
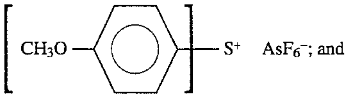
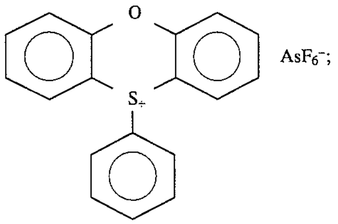
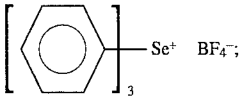
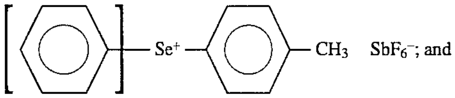
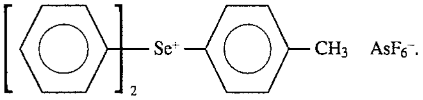
A representative portion of useful Group VIIa onium salts, including iodonium salts, are the following:
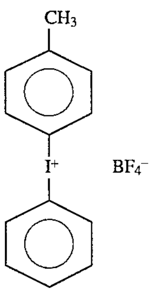
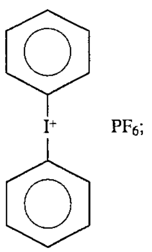

-continued

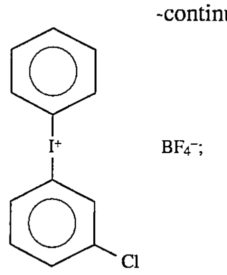

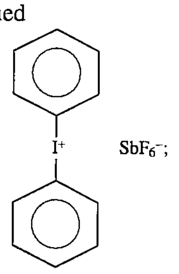

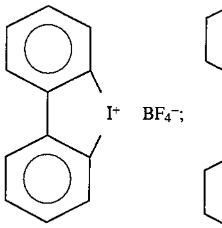

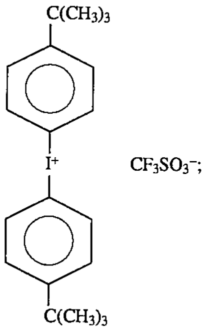

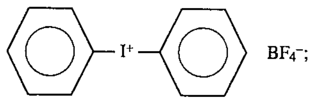

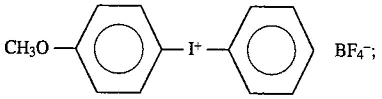

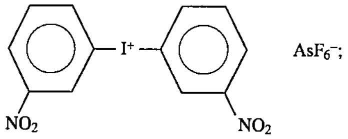

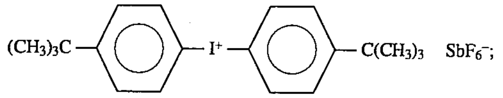

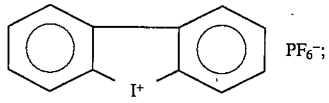

and

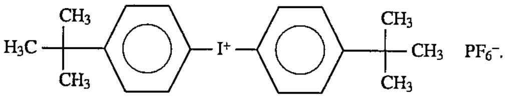

Also useful as acid photogenerating compounds are:

1. Aryldiazonium salts such as disclosed in U.S. Pat. Nos. 3,205,157; 3,71,396; 3,816,281; 3,817,840 and 3,829,369. The following salts are representative:

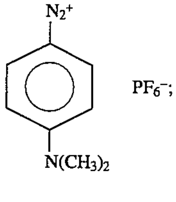

and

-continued

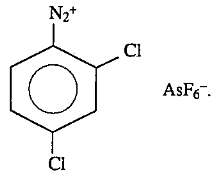

2. 6-Substituted-2,4-bis(trichloromethyl)-5-triazines such as disclosed in British Patent No. 1,388,492. The following compounds are representative:

| | R |
|---|---|
| 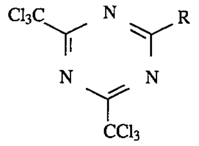 | 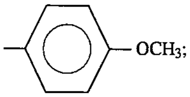 |
| | 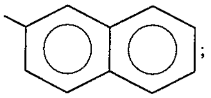 |
| | 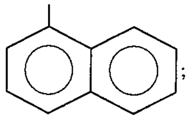 |
| | 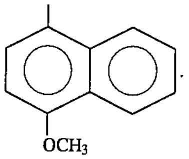 |

A particularly preferred class of acid photogenerators are the diaryliodonium salts and triarylsulfonium salts. For example, di-(4-t-butylphenyl) iodonium hexafluorophosphate, triphenylsulfonium hexafluorophosphate, di-(4-t-butylphenyl)iodonium trifluoromethane sulfonate, and triphenylsulfonium trifluoromethane sulfonate have shown particular utility.

The concentration of the acid photogenerating compound should be sufficient to bleach the near-infrared absorbing dye or pigment substantially or completely when element 10 is exposed to near-infrared radiation. A preferred weight range for the acid photogenerator in the coated and dried composition is from 15 weight percent to about 30 weight percent.

Many near-infrared absorbing dyes or pigments are known to exist. However, only those that are unreactive and unbleached upon combination with an acid-photogenerating compound before exposure, but bleach upon exposure to activating radiation are practically useful. Examples of useful near-infrared absorbing dyes include nitroso compounds or a metal complex salt thereof, methine dyes, cyanine dyes, merocyanine dyes, complex cyanine dyes, complex merocyanine dyes, holopolar cyanine dyes, hemicyanine dyes, styryl dyes, hemioxonol dyes, squarillium dyes, thiol nickel complex salts (including cobalt, platinum, palladium complex salts), phthalocyanine dyes, triallylmethane dyes, triphenylmethane dyes, immonium dyes, diammonium dyes, naphthoquinone dyes, and anthroquinone dyes.

Preferred near-infrared dyes include those of the cyanine class. Particularly useful cyanine dyes include 3,3'-diethylthiatricarbocyanine iodide ("DTTC") and 1,1'-diethyl-4, 4'-carbocyanine iodide (cryptocyanine).

The near-infrared absorbing dye or pigment should be present in a concentration sufficient to absorb strongly the activating radiation. The concentration of the near-infrared absorbing dye or pigment will vary depending upon the types of acid-photogenerator and near-infrared absorbing dye or pigment compounds used.

The bleachable composition may also include a near-ultraviolet radiation absorbing sensitizer to permit the achievement of further bleaching by subsequent exposure with near-ultraviolet radiation. The amount of sensitizer used varies widely, depending on the type of near-infrared absorbing dye or pigment and acid-photogenerating compound used, the thickness of thermoplastic surface layer 14, and the particular sensitizer used. Generally, the sensitizer may be present in an amount of up to about 10 percent by weight of layer 14.

Iodonium salt acid-photogenerators may be sensitized with ketones such as xanthones, indandiones, indanones, thioxanthones, acetophenones, benzophenones, or other aromatic compounds such as anthracenes, dialkoxyanthracenes, perylenes, phenothiazines, etc. Triarylsulfonium salt acid photogenerators may be sensitized by aromatic hydrocarbons, anthracenes, perylenes, pyrenes, and phenothiazines.

Near-ultraviolet absorbing sensitizers of the anthracene family are especially preferred when used in combination with the preferred onium salts described above. 9,10-disubstituted anthracenes, such as 9,10-diethoxyanthracene, are particularly useful.

Unless the acid photogenerator has thermoplastic properties, thermoplastic surface layer 14 will also typically contain a film-forming polymer binder. Useful binders for the acid photogenerating layers include polycarbonates, polyesters, polyolefins, phenolic resins, and the like. Desirably, the binders are film forming.

Preferred binders are styrene-butadiene copolymers; silicone resins; styrene-alkyd resins; soya-alkyd resins; poly-(vinyl chloride); poly(vinylidene chloride); vinylidene chloride, acrylonitrile copolymers; poly(vinyl acetate); vinyl acetate, vinyl chloride copolymers; poly(vinyl acetals), such as poly(vinyl butyral); polyacrylic and methacrylic esters, such as poly(methyl methacrylate), poly(n-butyl methacrylate), poly(isobutyl methacrylate), etc; polystyrene; nitrated polystyrene; poly(vinylphenol); polymethylstyrene; isobutylene polymers; polyesters, such as phenol formaldehyde resins; ketone resins; polyamides; polycarbonates; etc. Methods of making resins of this type have been described in the prior art, for example, styrene-alkyd resins can be prepared according to the method described in U.S. Pat. Nos. 2,361,019 and 2,258,423. Suitable resins of the type contemplated for use in the photoactive layers of this invention are sold under such trade names as Vitel PE 101-X, Cymac, Piccopale 100, Saran F-220. Other types of binders which can be used include such materials as paraffins, mineral waxes, etc. Particularly preferred binders are aromatic esters of polyvinyl alcohol polymers and copolymers, as disclosed in pending U.S. patent application Ser. No. 509,119, entitled "Photoelectrographic Elements".

When utilized at all, the binder is present in thermoplastic surface layer 14 in a concentration of 30 to 100 weight percent, preferably 55 to 80 weight percent.

Useful materials for conductive section 15 include any of the electrically conducting layers and supports used in electrophotography. These include, for example, paper (at a relative humidity above about 20 percent); aluminum paper laminates; metal foils, such as aluminum foil. zinc foil, etc.; metal plates, such as aluminum, copper, zinc, brass, and galvanized plates; regenerated cellulose and cellulose derivatives; certain polyesters, especially polyesters having a thin electroconductive layer (e.g, cuprous iodide or indium tin oxide) coated thereon; etc.

Support section 19 can be virtually any commonly-used sheet-like material, such as polymeric films, paper, etc. Particularly preferred are polyester films.

As shown in FIG. 1B, clear thermoplastic particles 12 are uniformly heated by a momentary application of diffuse energy which causes particles 12 to melt and coalesce. The diffuse energy may be radiation R incident on particles 12 or heat H conducted from heating elements (not shown) within the support 19 and conductive section 15.

As shown in FIG. 1C, the melted, coalesced particles in FIG. 1B cool to room temperature and form a smooth solid thermoplastic imaging surface 14 that is supportive of other particles utilized in the imaging process of the present invention.

The dimensions of thermoplastic imaging surface 14 and conductive section 15 of the element 10 are not to scale. Generally, imaging surface layer 14 would be 0.1 to 10 μm, preferably 1 μm, thick, while conductive section 15 could vary from a thickness of 100 Angstroms to much thicker dimensions.

FIG. 2 is a side schematic view, showing the deposition of marking particles on the thermoplastic imaging surface of the imaging element of FIG. 1C. Thermoplastic imaging surface layer 14 receives a marking particle layer 24 which is deposited by particle deposition device 20A. Particle deposition device 20A, having a biased magnetic brush connected to a bias voltage supply 22, contains a quantity of marking particles 24A which are deposited on the imaging surface layer 14. Conductive section 15 is connected to one potential of the bias voltage supply 22 such that an electrostatic field is established between marking particle layer 24 and conductive section 15 of imaging element 10. This attracts individual particles 24A in marking particle layer 24 to imaging element 10. Although FIG. 2 shows marking particle layer 24 as a single layer of positively charged particles 24A, in practice, the layer may be several particles deep.

FIG. 3 is a side schematic view, showing the marked, imaging element of FIG. 2 undergoing imagewise exposure. In this procedure, marking particle layer 24 or imaging element 10 is exposed to imagewise-modulated heat-inducing energy either from below element 10 (as shown in FIG. 3) or above element 10. Preferably, exposure is carried out by modulated scanning, near-infrared laser beam 42 produced by scanner 40. Due to the presence of the bleachable composition, such near-infrared radiation exposure causes exposed portions of thermoplastic surface layer 14 to bleach (i.e., be transformed to a colorless or near colorless state).

Those skilled in the art will recognize that the selection of the beam focal point is determined according to several factors such as the wavelength of the incident beam and the materials that constitute imaging member 10 and particle layer 24. Whether the focal point is selected to be conductive section 15, imaging surface layer 14, or marking particle layer 24, the objective of exposure is to establish a selectively-intensive amount of heat within a minute volume, or pixel 50, of imaging surface layer 14.

Beam 42, in addition to being modulated according to the image data to be recorded, is also line-scanned across imaging element 10. The contemplated exposure to heat-inducing energy heats a succession of pixels 50 in imaging element 10. At each exposed or addressed pixel, a respective localized state change or transformation of imaging surface layer 14 occurs—i.e., imaging surface layer 14 becomes selectively permeable by superposed marking particles 54 as a function of the amount and location of the heat that it receives.

Marking particles 54 that superpose a transformed pixel (i.e., addressed particles) migrate into imaging surface layer 14 as a result of their electrostatic attraction to conductive section 15 (though such migration is not necessarily to as great an extent as shown in FIG. 3). For thermoplastic marking particles, the induced heating will tack the addressed particles 54 together. After such exposure is completed, however, the addressed marking particles harden into a coherent group, and the transformed portions of imaging surface layer 14 return to a substantially non-permeable state. During such exposure, unaddressed marking particles remain undisturbed on imaging surface layer 14.

FIG. 4 is a side schematic view, showing the cleaning of the exposed imaging element of FIG. 3. This involves removal of unaddressed marking particles, with cleaner 20B. As a result, particles attached to imaging surface layer 14 remain. Cleaner 20B can be operated either after exposure is complete or while the unexposed areas of the frame are being addressed. Preferably, cleaner 20B removes unaddressed particles electrostatically by techniques which are well known in the art. For example, a magnetic brush that is free of marking particles may be passed over imaging element 10 to pick up the loose particles.

It is possible to carry out the marking particle deposition and cleaning steps with a single magnetic brush. This requires that the brush have means to alter it between a particle release mode and a particle attraction mode. For example, this could be achieved by reversal of the magnetic brush's biasing field. Alternatively, two magnetic brushes can be used.

Unaddressed marking particles need not be wasted. They can be removed by cleaning means 20B and ejected into a receptacle (not shown) for re-use in future marking particle deposition. If the marking particle deposition and cleaning steps are performed by the same device, that device can incorporate a marking particle collection receptacle.

Variations in the above sequence can be utilized. For example, the steps forming thermoplastic surface layer 14, as shown in FIGS. 1A to C, can preferably be deleted, and that layer can be formed by solvent coating a thermoplastic material on section 15. Alternatively, the above-described steps of uniformly heating particles 12 and then cooling them to form imaging surface layer 14 (in FIGS. 1B–C) may be omitted. Instead, with these thermoplastic particles in an undisturbed particulate state, marking particle layer 24 can be deposited over the thermoplastic particles. As a result, there are two particulate layers on conductive section 15. The superimposed particulate layers are then selectively exposed to heat. The heat-induced transformation of thermoplastic particles 12 allows the addressed marking particles to migrate and coalesce with the respectively-addressed thermoplastic particles. Imaging element 10 is then processed, as described in FIG. 4, so that both the unaddressed thermoplastic particles and the unaddressed marking particles are cleaned from conductive section 15. Addressed particles, when cooled to a solid state, remain attached to the supporting section in an imagewise pattern.

It is desirable for the bleachable composition to achieve bleaching concurrently with near infrared radiation exposure. If, however, satisfactory bleaching is not achieved by such exposure, further bleaching can be accomplished subsequently by exposure of imaged imaging element 10 with near-ultraviolet radiation. The ability to bleach with near-ultraviolet radiation is enhanced by the presence of a near-ultraviolet radiation sensitizer in the bleachable composition. Preferably, such near-ultraviolet radiation exposure is carried out after unaddressed particles are removed from element 10, in accordance with FIG. 4.

When the bleachable composition is present in thermoplastic surface layer 14, the composition contains 0 to 20 percent near-ultraviolet sensitizer, 1 to 60 percent acid photogenerator, 1 to 20 percent near-infrared absorbing dye or pigment, and the balance thermoplastic polymer binder. The thickness of layer 14 is 0.1 to 20 μm, preferably 2 μm.

In one alternative embodiment of the present invention, the bleachable composition is incorporated in marking particles 24A, while thermoplastic surface layer is simply formed from a thermoplastic binder. As a result, exposure of imaging element 10 with near infrared radiation, as shown in FIG. 3, causes heating and bleaching of the exposed (i.e., addressed) marking particles. Again, further bleaching can be achieved by exposing imaging element 10 to near-ultraviolet radiation or heating, preferably after removal of unaddressed particles. In this embodiment, the marking particles contain 0 to 10 percent near-ultraviolet sensitizer, 1 to 30 percent acid photogenerator, 1 to 10 percent near-infrared absorbing dye or pigment, and the balance thermoplastic binder. In this embodiment, it is also possible to form layers 14, 15, and 19 in FIG. 1C from a single sheet of paper.

There are other alternatives. The bleachable composition can be incorporated in both the marking particles and the imaging element. Another possibility is to incorporate the acid photogenerator in either the thermoplastic imaging surface layer or the marking particles, while the near-infrared radiation absorbing dye or pigment (and optionally the near-ultraviolet radiation sensitizer) is present in the other location. For example, the near-infrared radiation absorbing dye or pigment is incorporated in the marking particles, while the acid photogenerator is present in the thermoplastic imaging surface layer. This is advantageous, because, after near-infrared radiation exposure, unexposed marking particles are removed without need for bleaching at those unexposed locations. As a result, the acid photogenerator in the thermoplastic imaging surface layer has less dye or pigment to bleach and can be reduced in concentration. Alternatively, the acid photogenerator can be incorporated in the marking particles, while the near-infrared radiation absorbing dye or pigment is present in the thermoplastic imaging surface layer. This is somewhat disadvantageous, because bleaching only tends to occur in exposed areas. However, this problem can be alleviated by use of higher concentrations of acid photogenerators in the marking particles to insure bleaching.

Figure 5A:
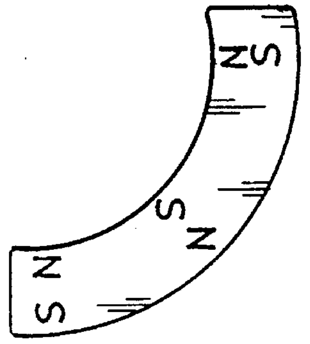
FIG. 5A is a schematic view, showing an alternative magnetic pole configuration for the fixed magnet of FIG. 5.
Figure 5:
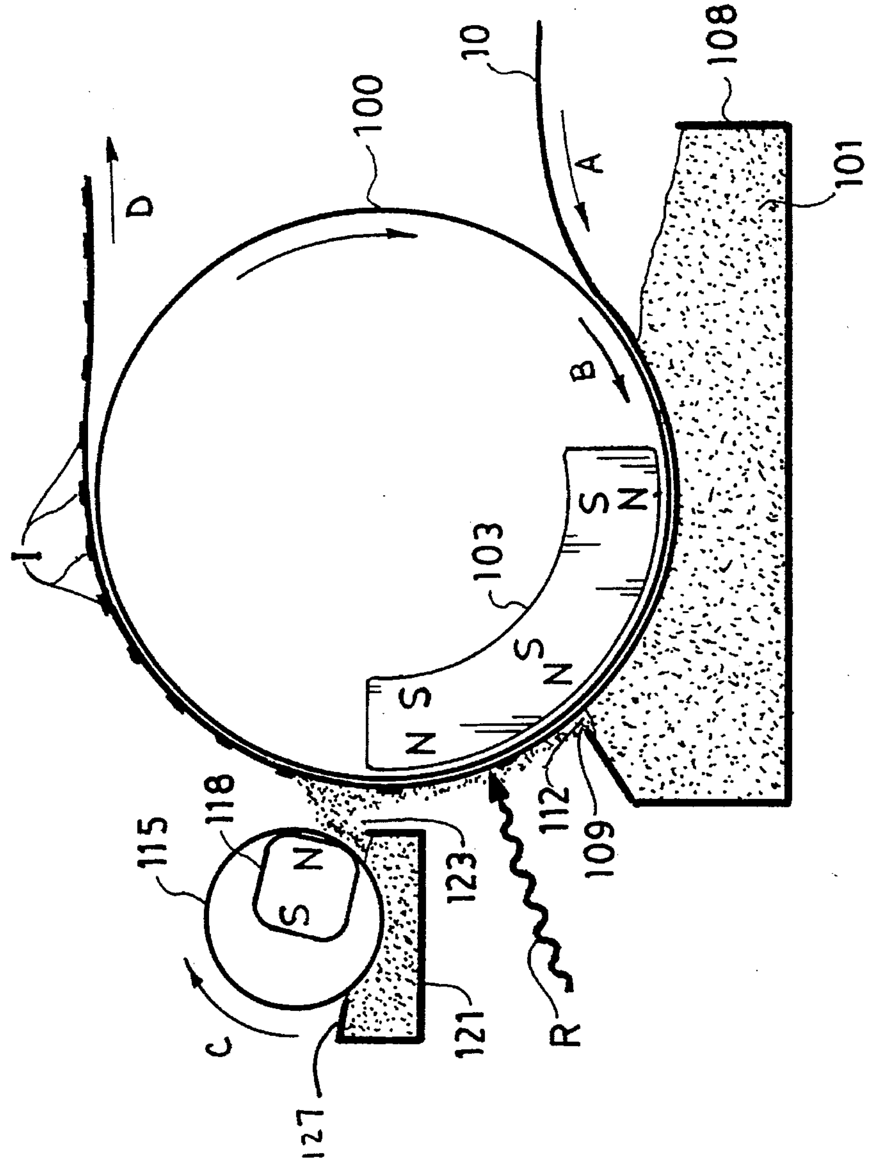
FIG. 5 is a schematic view, showing an embodiment of the invention employing a fixed magnet and hard or soft magnetic marking particles to attract the marking particles to the imaging element.
Figure 6:
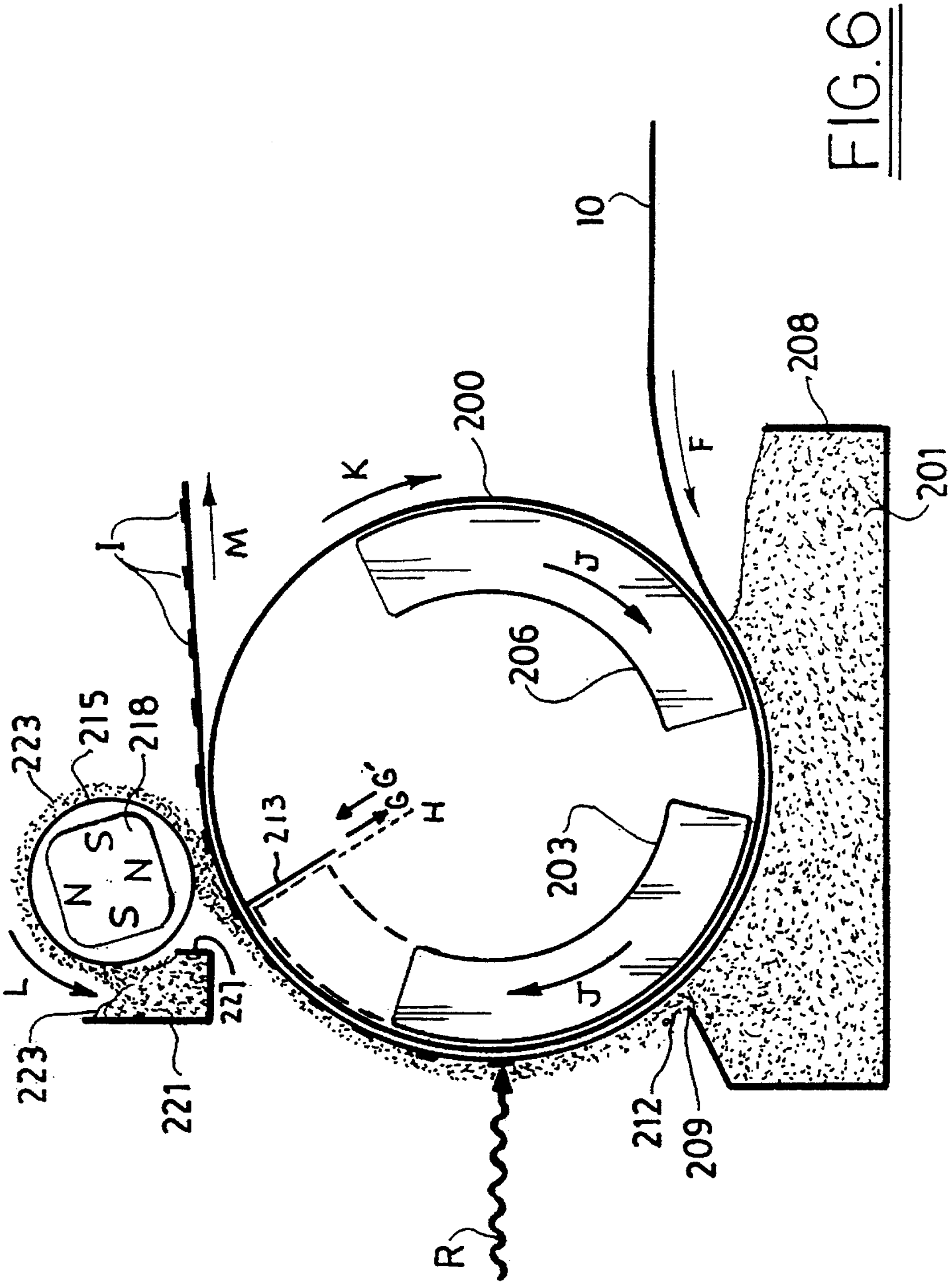
FIG. 6 is a schematic view, showing an alternative embodiment of the invention employing ferromagnetic elements and hard magnetic marking particles to attract the marking particles to the imaging element.
Figure 7:
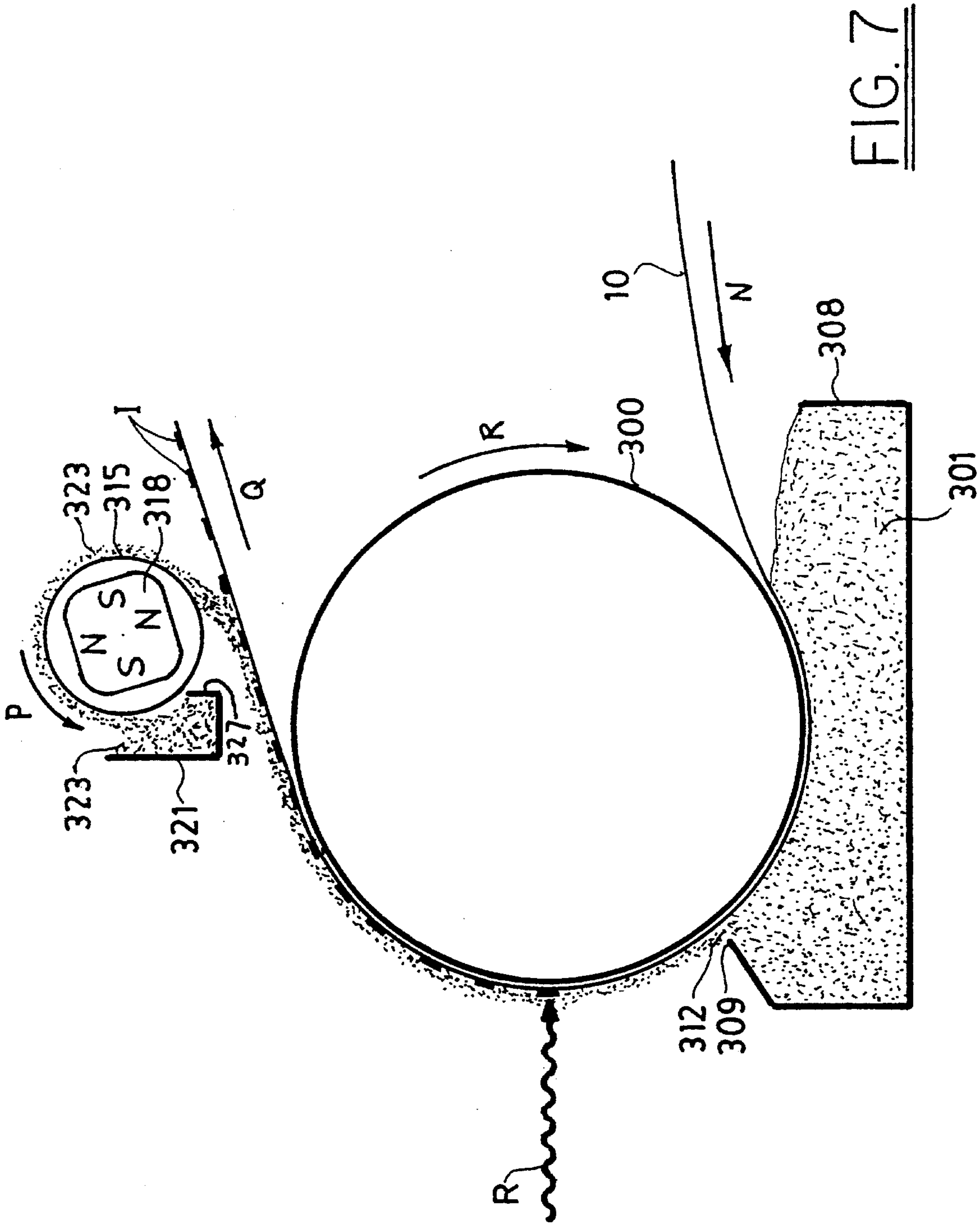
FIG. 7 is a schematic view, showing an alternative embodiment of the invention employing a ferromagnetic drum and hard magnetic marking particles to attract the marking particles to the imaging element.

FIGS. 5–7 are schematic views, showing alternative embodiments of the invention wherein the marking particles are magnetically attracted to the imaging element.

As shown in FIG. 5, imaging element 10 is fed onto non-magnetic rotating shell 100 in the direction of arrow A. Shell 100 may be composed of any suitable non-magnetic material, including aluminum and non-magnetic stainless steel, and may be cylindrical, elliptical or otherwise in shape. Imaging element 10 may be held on the outer surface of shell 100 by vacuum from a vacuum source (not shown), by electrostatic attraction, or by other surface forces.

Particle sump 108 contains magnetizable marking particles 101. Magnetizable marking particles useful in the practice of the invention are marking particles as previously described herein, except that such particles incorporate a magnetizable material. By "magnetizable" material, we mean both hard and soft magnetic materials which can be magnetized when placed in a magnetic field. Hard magnetic materials, also known as "fixed" or "permanent" magnets, permanently retain a magnetic field once magnetized. Soft magnetic materials are magnetically attractable, but are not, themselves, magnets. Soft magnetic materials retain a small remnant magnetization ($B_R$) when removed from the magnetic field. Suitable hard and soft magnetic materials for incorporation in the magnetizable toner particles useful in the practice of the invention are described in U.S. Pat. Nos. 4,517,268, 4,741,984, and 4,670,368, which also describe the incorporation of these materials in particles. U.S. Pat. Nos. 4,517,268, 4,741,984, and 4,670,368 are herein incorporated by reference.

As imaging element 10 rotates on the outer surface of shell 100 in the direction of arrow A into the magnetic field between fixed magnet 103 and the hard or soft magnetic marking particles 101 in particle sump 108, the particles are magnetically attracted by fixed magnet 103 and held to imaging element 10. The depth of the marking particles on the surface of imaging element 10 is determined and controlled at a relatively uniform level, roughly equivalent to the width of gap 112, by metering skive 109. As shell 100 continues to rotate, the marking particles 101 are imagewise exposed to near-infrared radiation R. As a result, the marking particles are heated causing the particles and the thermoplastic surface of imaging element 10 to soften, as described above in conjunction with FIGS. 1–4. The marking particles addressed by the radiation migrate into the thermoplastic imaging surface layer of imaging element 10 to form an imagewise pattern.

Unexposed marking particles are held to the surface of imaging element 10 by magnetic forces only. As imaging element rotates on shell 100 past the end of magnet 103, unexposed marking particles are no longer held by magnetic forces and can easily be removed by removal drum 115, comprising removal magnet 118, which preferably remains stationary as drum 115 rotates in the direction of arrow C. Unaddressed marking particles 123 are attracted to the outer surface of drum 115 until they are scraped into particle receptacle 121 by skive 127. As described above in connection with FIG. 4, unaddressed marking particles 123 may optionally be re-used.

Following the removal of unaddressed marking particles, imaging element 10, now bearing imaged areas I, continues to be carried on the outer surface of shell 100, until it is removed from the apparatus by pulling it in the direction of arrow D.

In one embodiment of the present invention, the pole configuration of magnet 103 is as shown in FIG. 5. FIG. 5A is a schematic view of a suitable alternative pole configuration which may be used in another embodiment of the invention. A fixed magnet of the type shown in 5A will cause either hard or soft magnetic marking particles to flip end over end as they pass through the alternating magnetic fields set up by magnet 103. Depending upon the surface properties of the imaging element and the marking particles, and the desired characteristics of the final product, an alternating pole configuration such as that shown in FIG. 5A may be desired.

FIG. 6 is a schematic view of an alternative embodiment for magnetically attracting the marking particles to the imaging element. As was described above in connection with FIG. 5, imaging element 10 is fed onto the outer surface of rotating, non-magnetic shell 200 in the direction of arrow F. In this case, however, the magnetic field is set up between one or more ferromagnetic elements 203 and 206, and hard magnetic marking particles 201 in particle sump 208. By "ferromagnetic" we mean soft magnetic materials as described above in connection with the soft marking particles which may be used as the marking particles 101 of FIG. 5. Suitable ferromagnetic materials are those having a relative permeability of between 1 and 10,000, where permeability (μ) is represented by the formula:

$$\mu = \frac{B}{H}$$

where B is the magnetic flux density in Gauss and H is the magnetic field strength in Oersteds. Examples of suitable "ferromagnetic" materials for elements 203 and 206 of FIG. 6 are iron, cobalt, nickel and alloys of these materials.

In the embodiment of the invention shown in FIG. 6, it is necessary to employ hard magnetic marking particles, which permanently retain a magnetic field once magnetized.

Referring again to FIG. 6, as imaging element 10 is transported on shell 200 between the magnetic marking particles 201 in particle sump 208 and ferromagnetic element 206, which moves in the direction of arrow J to stop at a position H, the marking particles are magnetically attracted to the imaging element. Ferromagnetic element 206 can be stopped at position H by bar 213, which is drawn back and forth in the directions of arrows G and G'. Metering skive 209 and gap 212 again control the height and smoothness of the marking particles at a uniform level.

It is possible to employ only one ferromagnetic element in the embodiment shown in FIG. 6. However, productivity can be significantly improved by using a plurality of such elements.

As was described above with reference to FIGS. 1–4, imagewise exposure with near-infrared radiation R heats the marking particles, which migrate into the thermoplastic imaging surface layer on element 10. After exposure, shell 200 continues to rotate in the direction of arrow K, while the rotation of ferromagnetic element 203 or 206 is stopped as described above. Once beyond the end of now-stopped element 203 or 206, unaddressed marking particles 223 may freely be removed by removal drum 215 comprising removal magnet 218, which preferably remains stationary while drum 215 rotates. Unaddressed particles 223 are attracted to the outer surface of drum 215, which rotates in the direction of arrow L. The particles are retained in particle receptable 221 by skive 227, where they are kept for later re-use, as described above, or discarded.

Once the unaddressed particles have been removed, imaging element 10, now bearing imaged areas I, is taken off shell 200 in the direction of arrow M. Ferromagnetic elements 203 and 206 are then returned to their initial positions, either by continuing to advance in the direction of arrow K, or by rotating back to their initial positions in the opposite direction.

In yet another embodiment, shown schematically in FIG. 7, hard magnetic marking particles 301 are magnetically attracted to imaging element 10 as it moves in the direction of arrow N, by rotating shell 300. Shell 300, which rotates in the direction of arrow R, is made from a ferromagnetic material as described above in connection with elements 203 and 206 in FIG. 6. The depth of the marking particles 301 on the surface of imaging element 10 is regulated by metering skive 309 and gap 312 as the imaging element rotates on shell 300. Imagewise exposure with near-infrared radiation heats hard magnetic marking particles 301, which migrate into the thermoplastic imaging surface layer of imaging element 10, as described above with reference to FIGS. 1–4. Removal of unaddressed marking particles is achieved by particle removal drum 315, which rotates in the direction of arrow P and which includes removal magnet 318, as described above for drum 215 with magnet 218 in FIG. 6. Unaddressed marking particles 323 are skimmed from the surface of removal drum 315 by skive 327, and collected in receptacle 321 for subsequent re-use.

As shown in FIGS. 5–7, the marking particles may be magnetically attracted to the imaging element where either the marking particles or the rotating shells (or an element otherwise behind the imaging element) incorporate permanent magnetic material. Alternatively, when a permanent magnet such as fixed magnet 103 in FIG. 5 is employed, magnets having various pole configurations may be used.

Various configurations besides those shown in FIGS. 5–7 are possible. For example, the rotating shells, as well as the magnets and ferromagnetic elements, can be of various shapes. Eccentric shapes may be used in order to shape the magnetic fields to take advantage of the rapid decrease in magnetic field strength as the space between the imaging element and the various magnetic structures increases. In this way, the productivity and efficiency of subsystems, such as toner removal, may be enhanced. Also, it is not necessary to magnetically remove unaddressed marking particles. Such particles could be allowed to fall away from the imaging element as it moves out of the magnetic field due to gravity. Alternatively, vacuum can be used to remove weakly held particles.

The imaging element can be in the form of a sheet or a web, and can itself incorporate a soft magnetic material. Furthermore, when it is desired to employ magnetic attraction in conjunction with electrostatic attraction, conductive section 15 described above in connection with FIGS. 1–4 may be made from a material which is both a soft magnetic material and conductive, or may otherwise incorporate a soft magnetic material. Alternatively, conductive materials such as iron or nickel, or alloys of these materials, may be used for the ferromagnetic shell 300 as shown in FIG. 7. In yet another alternative embodiment, the magnetic and electrostatic attractions may be created simultaneously using separate materials and structures. In addition, the number of ferromagnetic elements shown in FIG. 6 is not critical, and the relative movement of these elements within the shell may be synchronous or independent.

The use of a magnetic field to establish an attraction between marking particles and an imaging element is not limited to elements or particles or methods employing the bleachable compositions of the present invention. A magnetic attraction may also be employed in the imaging methods described in U.S. Pat. Nos. 5,138,388 to Kamp, et al. and 5,227,265 to DeBoer, et al., which are hereby incorporated by reference, alone or in conjunction with electrostatic forces.

Yet another aspect of the invention is a method of migration imaging using an imaging member having a thermoplastic imaging surface layer without the bleachable compositions disclosed above. Marking particles are deposited on the imaging surface layer, and the marking particles are magnetically attracted to the imaging surface layer, as described above. The imaging member is then exposed to heat-inducing energy to imagewise transform the imaging surface layer to a state permeable by the marking particles. In accordance with the magnetic attraction, selected marking particles addressed by the heat-inducing energy migrate with the imaging surface layer in an imagewise pattern. Unaddressed marking particles are then removed from the imaging member. A migration imaging method employing an electrostatic attraction between the marking particles and the imaging surface layer, is described in U.S. Pat. No. 5,227,265 to DeBoer et al., hereby incorporated by reference.

As was described above in conjunction with the migration imaging method employing bleachable compositions, the marking particles can be magnetically attracted to the imaging surface layer by applying the imaging member to a support surface which in corporates either hard or soft magnetic materials. If a magnetic support surface is used, the marking particles may be either hard or soft magnetic marking particles. Hard magnetic marking particles must be used with a soft magnetic support surface.

EXAMPLES

In the examples which follow, the preparation of representative materials, the formulation of representative films, and the characterization of these films are described. These examples are provided to illustrate the usefulness of the bleachable composition of the present invention and are by no means intended to limit the above disclosure.

Example 1

A thin film comprising 25 wt % di-(t-butylphenyl)iodonium trifluoromethanesulfonate ("ITf") as the acid generator, 5 wt % 9,10-diethoxyanthracene ("DEA") as the near-UV sensitizer, 3 wt % 3,3'-diethylthiatricarbocyanine iodide ("DTTC") as the near-IR dye, and 67 wt % poly(vinyl benzoate-co-vinylacetate) in a benzoate to acetate mole ratio of 88 to 12 ("PVBzAc") was coated over a transparent support. The film appeared pale green as coated, and photomicroscopy of a cross-section showed it to be 2.8 μm thick. Spectroscopy showed strong absorption from 600 to 850 nm, which displayed a maximum at 781 nm with an optical density ("O.D.") of 2.67. The film also displayed several absorption maxima between 350 and 420 nm due to the near-UV sensitizer, DEA.

A portion of the film was exposed to near-UV light from a 500-W mercury arc source for 90 seconds, for a total exposure of ca. 2.7 Joules/cm. The pale green color was completely faded, and spectroscopy showed less than 0.10 optical density at wavelengths greater than 600 nm.

Another portion of the film was evaluated for sensitivity to near-infrared radiation using a breadboard equipped with a 200 mW near-infrared laser diode (827 nw) with output beam focused to about a 30 micron spot. The drum rotation, the laser-beam location, and the laser beam power were all controlled by computer. The drum was rotated at a speed of 120 RPM, and the film was exposed to an electronically-generated continuous tone stepwedge. The stepwedge thus produced appeared rust-colored in the areas of maximum exposure. Six density steps in the wedge were clearly visible. Spectroscopy of an area which had received maximum exposure revealed an O.D. of 0.41 at 780 nm. The exposed sample also displayed a second absorption maximum near 550 nm with an O.D. of 0.29. When this sample was further exposed with near-UV light in the manner described above, the rust color completely faded, and spectroscopy showed less than 0.13 O.D. at wavelengths greater than 600 nm, 0.20 O.D. at 550 nm.

Example 2

A film similar to that described in Example 1 was also coated, except that no near-UV sensitizer was added. The weight ratios of the components were 25% ITf, 3% DTTC, and 72% PVBzAc. The thickness was 7.4 mm, and the O.D. at 780 nm was greater than 4.0. After exposure to near-UV radiation, as described in Example 1, the O.D. at 780 nm was 1.42. A second maximum was observed with O.D. of 0.46 at 545 nm. Thus, by comparison to Example 1, for efficient bleaching with near-UV radiation, a near-UV sensitizer such as DEA is preferred.

A second portion of this film was exposed on the breadboard in the same manner as described in Example 1. The areas which received maximum exposure were rust-colored, and six clear density steps were visible. Spectroscopy of the maximum exposed area revealed absorption maxima at 545 nm (O.D.=0.43) and 775 nm (O.D.=0.63). Thus, the near-UV sensitizer is not required for bleaching concurrent with near-IR exposure.

Example 3

Another film was coated in the same manner as described in Example 1, except that no acid photogenerator (i.e., ITf) was included. The weight ratios of the components were 5% DEA, 3% DTTC, and 92% PVBzAc. The film was 3.2 μm thick, and displayed an absorption maximum at 785 nm (O.D.=1.29). After exposure with near-UV light as described above, the O.D. at 785 nm was found to be 0.83. Near-IR exposure on the breadboard resulted in no visible change in density or hue. Spectroscopy of an area which had received maximum exposure showed virtually no difference when compared to an adjacent, unexposed area. Thus, for significant bleaching to occur with either near-IR or near-UV radiation, the acid photogenerator must be present.

Example 4

A film was coated in the same manner as described in Example 1, except that neither acid photogenerator (i.e., ITf) nor near-UV sensitizer (i.e., DEA) were included. The film comprised 3 wt % DTTC and 97 wt % PVBzAc. The film was 5.6 μm thick, and displayed an absorption maximum at 780 nm (O.D.=1.34). Exposure to near-UV radiation resulted in only slight bleaching, but near-IR radiation resulted in virtually no spectroscopic changes.

Example 5

Films were coated as described in Example 1, except that the acid-photogenerating material was varied. Film thicknesses ranged between 8 and 11 μm. Table 1 below lists these variations and their effect on bleaching as a function of both near-UV and near-IR exposure. The samples were exposed in the same manner, as described in Example 1. In Table 1, bleaching efficiency is defined as:

$$1 - \left[ \frac{\text{O.D. @ 700 nm [exposed]}}{\text{O.D. @ 700 nm [unexposed]}} \right]$$

The O.D. at 700 nm was chosen as the reference point because many of the films display O.D.s at the 780 nm absorption maximum that were too high to be recorded with equipment being utilized.

TABLE 1

| ENTRY | ACID-PHOTOGENERATOR | BLEACHING EFFICIENCY NEAR-UV | BLEACHING EFFICIENCY NEAR-IR |
|---|---|---|---|
| A | di-(4-t-butylphenyl) iodonium trifluoromethane sulfonate | 0.80 | 0.82 |
| B | di-(4-t-butylphenyl) iodonium hexafluorophosphate | 0.91 | 0.76 |
| C | di(4-t-butylphenyl) iodonium tolyl sulfonate | 0.36 | 0.43 |
| D | di-(4-t-butylphenyl) iodonium perfluorobutyrate | 0.51 | 0.33 |
| E | di-(4-t-butylphenyl) iodonium hexafluorophosphate | 0.92 | 0.14 |
| F | di-(4-t-butylphenyl) iodonium hexafluoroantimonate | 0.83 | 0.13 |
| G | None (control) | 0.34 | 0.15 |

Table 1 shows that several onium salt acid photogenerators can be used in the present invention.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A method of migration imaging using an imaging element comprising a thermoplastic imaging surface layer, said method comprising:

depositing marking particles as a substantially continuous layer on said thermoplastic imaging surface layer;

attracting the marking particles to said imaging element;

exposing the imaging element in an imagewise pattern with near-infrared radiation, whereby said thermoplastic imaging surface layer is heated so that the marking particles addressed by said exposing migrate into said thermoplastic imaging surface layer to form an imagewise pattern; and removing unaddressed marking particles from said thermoplastic imaging surface layer, wherein a bleachable composition comprising an acid photogenerator and a near-infrared radiation-absorbing dye, or pigment which undergoes bleaching, during said exposing, is present in the marking particles; or both said thermoplastic imaging surface layer and the marking particles; or the acid photogenerator is in the marking particles and the near-infrared radiation-absorbing dye or pigment is in said thermoplastic imaging surface layer.

2. A method according to claim 1, wherein the marking particles contain the bleachable composition.

3. A method according to claim 1, wherein both said thermoplastic imaging surface layer and the marking particles contain the bleachable composition.

4. A method according to claim 1, wherein the acid photogenerator is in the marking particles and the near-infrared radiation-absorbing dye or pigment is in said thermoplastic imaging surface layer.

5. A method according to claim 1, wherein the acid photogenerator is an aromatic onium salt selected from the group consisting of aryl halonium salts, aryl phosphonium salts, aryl arsenonium salts, aryl sulfonium salts, aryl selenonium salts, aryl diazonium salts, and mixtures thereof.

6. A method according to claim 1, wherein the acid photogenerator is selected from the group consisting of triphenylsulfonium and di-4-t-butylphenyl)iodonium hexafluorophosphates and trifluoromethanesulfonates.

7. A method according to claim 1, wherein said near-infrared radiation-absorbing dye or pigment is selected from the group consisting of 3,3'-diethyl-thiatricarbocyanine iodide, cryptocyanine, and mixtures thereof.

8. A method according to claim 1 further comprising:

exposing said thermoplastic imaging surface layer with near-ultraviolet radiation after said removing to effect further bleaching of said near-infrared radiation-absorbing dye or pigment.

9. A method according to claim 1, wherein the bleachable composition further comprises a near-ultraviolet radiation sensitizer and said thermoplastic imaging surface layer is exposed with near-ultraviolet radiation after said removing to effect further bleaching of said near-infrared radiation-absorbing dye or pigment.

10. A method according to claim 1, wherein said thermoplastic imaging surface layer or the marking particles contain 0.1 to 20% of said near-infrared radiation-absorbing dye or pigment, 1.0 to 60% of said acid photogenerator, 0 to 20% of a near-ultraviolet radiation sensitizer, and a thermoplastic binder being the balance.

11. A method according to claim 1, wherein the acid photogenerator is selected from the group consisting of aromatic onium salts selected from the group consisting of Group Va, Group VIa, and Group VIIa elements, diazonium salts and 6-substituted-2,4-bis-(trichloromethyl)-5-triazines having the structure

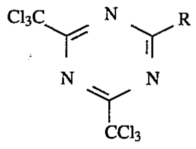

wherein R represents

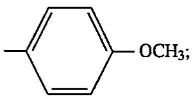

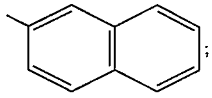
;

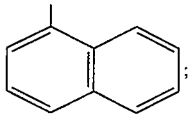
;

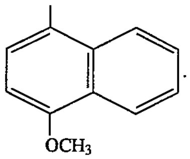
.

12. A method of migration imaging using an imaging element with a thermoplastic imaging surface layer, said method comprising:

depositing marking particles as a substantially continuous layer on said thermoplastic imaging surface layer;

attracting the marking particles to said imaging element magnetically or both magnetically and electrostatically;

exposing the imaging element in an imagewise pattern with near-infrared radiation, whereby said thermoplastic imaging surface layer is heated so that the marking particles addressed by said exposing migrate into said thermoplastic imaging surface layer to form an imagewise pattern and removing unaddressed marking particles from said thermoplastic imaging surface layer, wherein both the marking particles and the thermoplastic imaging surface layer comprise:

an acid photogenerator comprising an aromatic onium salt selected from the group consisting of aryl halonium salts, aryl phosphonium salts, aryl arsenonium salts, aryl sulfonium salts, aryl selenonium salts, aryl diazonium salts, and mixtures thereof and a near-infrared radiation-absorbing dye or pigment.

13. A method as in claim 12 wherein said attracting is achieved magnetically.

14. A method according to claim 12, wherein said conductive layer further comprises a soft magnetic material, and said attracting is achieved magnetically and electrostatically.

15. A method of migration imaging using an imaging element with a thermoplastic imaging surface layer comprising:

an acid photogenerator comprising an aromatic onium salt selected from the group consisting of aryl halonium salts, aryl phosphonium salts, aryl arsenonium salts, aryl sulfonium salts, aryl selenonium salts, aryl diazonium salts, and mixtures thereof, said method comprising:

depositing marking particles as a substantially continuous layer on said thermoplastic imaging surface layer, wherein the marking particles comprise a near-infrared radiation-absorbing dye or pigment;

attracting the marking particles to said imaging element magnetically; or both magnetically and electrostatically;

exposing the imaging element in an imagewise pattern with near-infrared radiation, whereby said thermoplastic imaging surface layer is heated so that the marking particles addressed by said exposing migrate into said thermoplastic imaging surface layer to form an imagewise pattern; and removing unaddressed marking particles from said thermoplastic imaging surface layer.

16. A method according to claim 15, wherein said attracting is achieved magnetically.

17. A method according to claim 15, wherein said conductive layer further comprises a soft magnetic material and said attracting is achieved magnetically and electrostatically.

18. A method of migration imaging using an imaging element with a thermoplastic imaging surface layer, wherein said thermoplastic imaging surface layer comprises:

a thermoplastic binder selected from the group consisting of polycarbonates, polyesters, polyolefins, phenolic resins, paraffins, polystyrenes, and mixtures thereof, an acid photogenerator comprising an aromatic onium salt selected from the group consisting of aryl halonium salts, aryl phosphonium salts, aryl arsenonium salts, aryl sulfonium salts, aryl selenonium salts, aryl diazonium salts, and mixtures thereof; and a near-infrared radiation-absorbing dye or pigment, said method comprising:

depositing marking particles as a substantially continuous layer on said thermoplastic imaging surface layer;

attracting the marking particles to said imaging element magnetically; or magnetically and electrostatically;

exposing said imaging element in an imagewise pattern with near-infrared radiation, whereby said thermoplastic imaging surface layer is heated so that the marking particles addressed by said exposing migrate into said thermoplastic imaging surface layer to form an imagewise pattern; and removing unaddressed marking particles from said thermoplastic imaging surface layer.

19. A method according to claim 18, wherein said conductive layer further comprises a soft magnetic material, and said attracting is achieved magnetically and electrostatically.

20. A method according to claim 18, wherein said attracting is achieved magnetically.

* * * * *